United States Patent
Varekamp et al.

(10) Patent No.: US 10,462,446 B2
(45) Date of Patent: Oct. 29, 2019

(54) PROCESSING A DEPTH MAP FOR AN IMAGE

(71) Applicant: KONINKLIJKE PHILIPS N.V., Eindhoven (NL)

(72) Inventors: Christiaan Varekamp, Eindhoven (NL); Patrick Luc Els Vandewalle, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/779,877

(22) PCT Filed: Dec. 8, 2016

(86) PCT No.: PCT/EP2016/080164
§ 371 (c)(1),
(2) Date: May 30, 2018

(87) PCT Pub. No.: WO2017/108413
PCT Pub. Date: Jun. 29, 2017

(65) Prior Publication Data
US 2018/0309974 A1    Oct. 25, 2018

(30) Foreign Application Priority Data

Dec. 21, 2015    (EP) .................................... 15201620

(51) Int. Cl.
*H04N 13/128*    (2018.01)
*H04N 13/106*    (2018.01)
(Continued)

(52) U.S. Cl.
CPC ............. *H04N 13/128* (2018.05); *G06T 7/50* (2017.01); *H04N 13/106* (2018.05); *H04N 13/302* (2018.05); *G06T 2207/10021* (2013.01)

(58) Field of Classification Search
CPC ................ H04N 13/128; H04N 13/302; G06T 2207/10021; G06T 7/50
See application file for complete search history.

(56) References Cited

U.S. PATENT DOCUMENTS 6,751,338 B1   6/2004  Wallack
9,240,049 B2 *  1/2016  Ciurea ................. H04N 13/232
(Continued)

FOREIGN PATENT DOCUMENTS

CN    102074020 B    8/2012
EP    2887312 A1    6/2015
(Continued)

*Primary Examiner* — Shawn S An

(57) ABSTRACT

An apparatus comprises a depth map source (109) providing a depth map for an image and a confidence map source (111) providing a confidence map with confidence values for pixels of the depth map. The confidence values designate the pixels as confident or non-confident pixels reflecting whether the depth value meets a reliability criterion or not. A depth modifier (113) performs a depth modification operation which modifies depth values for pixels of the depth map. A modified depth value for a first pixel is determined as a current depth value for the first pixel if this is designated as a confident pixel or if there are no confident pixels within a neighborhood set of pixels, and otherwise the modified value is determined as the maximum of the current depth value and a depth value determined as a function of depth values of pixels within the neighborhood set being designated as confident pixels.

20 Claims, 2 Drawing Sheets

(51) Int. Cl.
*G06T 7/50* (2017.01)
*H04N 13/302* (2018.01)

(56) References Cited

U.S. PATENT DOCUMENTS

| 2012/0082368 A1* | 4/2012 | Hirai | G06T 5/002 |
| | | | 382/154 |
| 2013/0077880 A1* | 3/2013 | Venkataraman | G06T 9/00 |
| | | | 382/232 |
| 2014/0368613 A1* | 12/2014 | Krupka | G01S 17/36 |
| | | | 348/46 |

FOREIGN PATENT DOCUMENTS

| WO | 2006117707 A2 | 11/2006 |
| WO | 2012114236 A1 | 8/2012 |

* cited by examiner

PROCESSING A DEPTH MAP FOR AN IMAGE

CROSS-REFERENCE TO PRIOR APPLICATIONS

This application is the U.S. National Phase application under 35 U.S.C. § 371 of International Application No. PCT/EP2016/080164, filed on Dec. 8, 2016, which claims the benefit of EP Patent Application No. EP 5201620.0, filed on Dec. 21, 2015. These applications are hereby incorporated by reference herein.

FIELD OF THE INVENTION

The invention relates to a method and apparatus for processing a depth map for an image, and in particular, but not exclusively, to determining a depth map based on estimated disparity values.

BACKGROUND OF THE INVENTION

Three dimensional (3D) displays add a third dimension to the viewing experience by providing a viewer's two eyes with different views of the scene being watched. This can be achieved by having the user wear glasses to separate two views that are displayed. However, as this may be considered inconvenient to the user, it is in many scenarios preferred to use autostereoscopic displays that use means at the display (such as lenticular lenses, or barriers) to separate views, and to send them in different directions where they individually may reach the user's eyes. For stereo displays, two views are required whereas autostereoscopic displays typically require more views (such as e.g. nine views).

However, the quality of the presented three dimensional image depends on the quality of the received image data, and specifically the three dimensional perception depends on the quality of the received depth information.

Three dimensional image information is often provided by a plurality of images corresponding to different view directions for the scene. Specifically, video content, such as films or television programs, are increasingly generated to include some 3D information. Such information can be captured using dedicated 3D cameras that capture two simultaneous images from slightly offset camera positions.

However, in many applications, the provided images may not directly correspond to the desired directions, or more images may be required. For example, for autostereoscopic displays, more than two images are required, and indeed often 9-26 view images are used.

In order to generate images corresponding to different view directions, view point shifting processing may be employed. This is typically performed by a view shifting algorithm which uses an image for a single view direction together with associated depth information. However, in order to generate new view images without significant artefacts, the provided depth information must be sufficiently accurate. In particular, dense and accurate depth maps are required when rendering multi-view images for autostereoscopic displays.

Unfortunately, the depth information generated at sources tend to be suboptimal and in many applications, it is not as accurate as desired.

One way of capturing depth information when capturing a scene is to use multiple cameras at different spatial positions representing different view ranges. In such examples, depth information is generated by estimating and extracting depth values by comparing view images for different view directions.

In many applications, three dimensional scenes are captured as stereo images using two cameras at slightly different positions. Specific depth values may then be generated by estimating disparities between corresponding image objects in the two images. However, such depth extraction and estimation is problematic and tends to result in non-ideal depth values. This may again result in artefacts and a degraded three dimensional image quality.

Another approach for capturing depth information is to directly use depth cameras or range imaging cameras. Such cameras may directly estimate the depth to objects in the scene based on time-of-flight measurements for emitted (typically infrared) signals. However, such cameras are also associated with imperfections and typically provide suboptimal depth information.

Indeed, for both disparity estimation from a stereo camera setup and an infrared based depth camera, certain areas are inherently hard to estimate. For example, for disparity estimation occlusion areas exist that are visible in one camera view but not in the other, and this prevents accurate depth determination in such areas. Also, homogeneous areas that have the same or very similar visual properties in the different input images do not provide suitable basis for disparity estimation. In such areas, disparity estimates based on matching will be very uncertain. For infrared depth cameras, distant objects will result in a low infrared reflectance, and thus a low signal-to-noise ratio of the depth estimates. Also, certain types of objects, such as hair, have a particular infrared scattering behavior that results in a low back-scatter and thus in poor depth estimates from a depth camera.

For both the stereo camera system and a depth sensor there are ways to detect which disparity or depth estimates are reliable and which disparity or depth estimates are not reliable. Areas for which reliable depth estimates cannot be generated are typically filled using a weighted average of surrounding depth values where the color image is used as guidance in the interpolation/diffusion. However, such an approach may in many scenarios result in suboptimal depth estimates which further may degrade image quality and depth perception for a three dimensional image generated using such depth information.

Hence, an improved approach for processing depth information would be advantageous and in particular an approach allowing increased flexibility, facilitated implementation, reduced complexity, improved depth information, an improved three dimensional experience and/or improved perceived image quality would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for processing a depth map, the apparatus comprising: a depth map source for providing a depth map for an image, the depth map comprising depth values for pixels of the depth map; a confidence map source for providing a confidence map comprising confidence values for pixels of the depth map, the confidence value for a pixel designating the pixel as a confident pixel or a non-confident pixel, a confident pixel having a depth value meeting a reliability criterion and a non-confident pixel having a depth value not meeting the reliability criterion; a depth modifier arranged to perform a depth modification operation comprising modifying depth values for pixels of the depth map, the depth modifier being arranged to set a modified depth value for a first pixel to a current depth value for the first pixel if the first pixel is designated as a confident pixel or if there are no confident pixels within a neighborhood set of pixels for the first pixel, and to otherwise set the modified value to a highest depth value of the current depth value and a depth value determined as a function of depth values of pixels within the neighborhood set of pixels that are designated as confident pixels.

The invention may allow an improved depth map to be generated in many scenarios. In particular, the approach may in many applications reduce the risk of depth reversal where objects appear in front of other objects that should be further in the foreground. In particular, the approach may apply an advantageous approach for improving/generating depth values in areas in which the original depth values are likely to be less accurate and less reliable. The specific approach applied for generating such new depth values may in many embodiments allow the depth values in unreliable or uncertain regions to be determined from other more reliable depth values while constraining such determination to prevent perceived depth reversal or disorder.

The approach may further allow efficient implementation and may provide a process for determining improved depth values which is suitable for processing a depth image.

The depth map and confidence map may be associated with an image and may thus provide depth information for the content of the image. The depth map may in some embodiments have a lower resolution than the image, and thus in some embodiments depth values may be provided for groups of image pixels. For example, in many embodiments, each depth pixel (i.e. pixel of the depth map) may correspond to a pixel block of 4 by 4, or 8 by 8, pixels in the image.

A confident pixel may also be referred to as a reliable pixel and a non-confident pixel as an unreliable pixel. The reliability criterion may depend on the specific preferences and requirements of the individual embodiment, and it is not essential which criterion is used. Rather, the output of the process may depend on the specific reliability criterion used, and thus the criterion can be varied to achieve the desired result. In some embodiments, the reliability criterion may be applied prior to confidence values being stored in the confidence map, and specifically it may be applied when the confidence map is initially generated. In such embodiments, the confidence values may be binary values denoting the corresponding pixels as a confident or non-confident pixel. In other embodiments, the reliability criterion may be evaluated e.g. during the processing of a given pixel. For example, a non-binary confidence value may be retrieved from the confidence map, and this value may then be subjected to the reliability criterion to determine whether the confidence value designates a confident or a non-confident value.

In some embodiments, the confidence values may be non-binary values indicating an estimated reliability of the corresponding depth value. Such a reliability estimate may for example be generated as part of the depth determination algorithm used to generate the initial depth values. The reliability criterion may in some embodiments reflect that a pixel is designated as confident if the confidence value is above a threshold and a non-confident pixel otherwise. The threshold may in some embodiments be fixed or may e.g. be variable, possibly as a function of other confidence values.

The depth modification operation may thus generate new depth values in response to specific criteria which includes a depth order constraint. The depth modification operation may process all pixels of the depth map and for each pixel determine the modified depth value. The depth modification operation may specifically include a scanning of the depth map which includes all pixels of the depth map. The scan order may vary between different embodiments. The modified depth value is the value of the depth map following the performance of the depth modification operation. It will be appreciated that for a given pixel this value may be different from the depth value prior to the depth modification operation or may be the same depending on the evaluation for the specific pixel. The modified depth value may be the output depth value of the processing. The depth value determined as a function of depth values of pixels within the neighborhood set of pixels that are designated as confident pixels may be considered as a changed depth value or a replacement value. The modified depth value/the output depth value may be set to the changed or replacement depth value or to the original depth value (i.e. the depth value may be unchanged/maintained). This choice is dependent on outcome of the decisions based on the consideration of whether pixels are confident or non-confident pixels.

The neighborhood set may include pixels in a neighborhood of the current pixel. The neighborhood set may correspond to the pixels in a kernel applied to the first pixel. The neighborhood may be a contiguous subset of pixels including the first pixel.

In accordance with an optional feature of the invention, depth modifier is arranged to iterate the depth modification operation, each depth moderation operation being performed on a modified depth map from a previous iteration.

The approach may provide particularly efficient operation when used iteratively. Indeed, the individual specific depth modification operation is highly suitable for iteration with each iteration providing improved depth values in e.g. border areas between confident and non-confident pixels. Each depth modification operation may effectively "grow" an area of confident pixels into an area of non-confident pixels. Iterating the depth modification operation allows this "growth" or expansion to extend further into the non-confident area while using the outcome of the previous iteration to generate further depth values. For example, the depth values of pixels for which improved depth values are generated in the current iteration may in the next iteration be used as confident pixels, and may thus be used to modify other depth values.

The approach may in many embodiments provide very advantageous performance in practice while maintain low complexity and efficient processing.

In accordance with an optional feature of the invention, the depth modifier (113) is arranged to, for each depth moderation operation, modify confidence values of the confidence map; and wherein each depth moderation operation is based on a modified confidence map from a previous iteration.

This may provide advantageous performance and may allow improved depth values to be generated. It may e.g. provide an efficient approach for expanding confident areas into non-confident areas.

In accordance with an optional feature of the invention, the depth modifier is arranged to change a pixel from being designated as a non-confident pixel to be designated as a confident pixel in response to a detection that the neighborhood set comprises at least one confident pixel.

This may provide a particularly advantageous approach for propagating reliable depth values/pixels between iterations resulting in advantageous performance for most practical scenarios.

In accordance with an optional feature of the invention, the depth modifier is arranged to perform a predetermined number of iterations.

This may provide efficient operation and high performance while maintaining a low complexity.

In accordance with an optional feature of the invention, the predetermined number of iterations is no more than eight iterations.

Using a relatively low number of iterations may reduce complexity, reduce computational resource, and prevent the expansion of confident areas into non-confident areas to be too excessive (e.g. resulting in conflicts with depth values belonging to other confident areas). In particular, using no more than eight iterations provide a very advantageous process for many practical applications.

In accordance with an optional feature of the invention, the depth modifier is arranged to dynamically adapt a number of iterations in response to a depth property determined from depth values of the depth map.

This may provide improved performance in many scenarios and may provide improved adaptation and optimization for the current conditions.

In accordance with an optional feature of the invention, the function comprises an averaging of depth values of pixels within the neighborhood set of pixels that are designated as confident pixels.

This may result in an improved depth map in many embodiments, and has in practice been realized to provide a particularly advantageous and natural three dimensional viewing experience for many typical images.

In accordance with an optional feature of the invention, the function comprises selecting a maximum of depth values of pixels within the neighborhood set of pixels that are designated as confident pixels.

This may result in an improved depth map in many embodiments, and has in practice been realized to provide a particularly advantageous and natural three dimensional viewing experience for many typical images.

In accordance with an optional feature of the invention, the neighborhood set includes only pixels with a distance to the first pixel of less than a threshold, the threshold not exceeding five pixels.

This provides a particularly advantageous trade-off between perceived depth quality and complexity and resource usage in many practical applications and scenarios. In particular, it has been realized that a relatively small neighborhood set is particularly suitable for e.g. iteration of the depth modification operation.

In accordance with an optional feature of the invention, the depth modifier is arranged to determine a size of the neighborhood set in response to a depth property determined from depth values of the depth map.

This may provide improved performance in many scenarios and may provide improved adaptation to, and optimization for, the current conditions.

In accordance with an optional feature of the invention, the depth map is for a frame of a video signal and the depth map source is arranged to determine initial depth values for non-confident pixels of the depth map using temporal prediction from other frames of the video signal.

This may in many scenarios provide a system wherein a particularly high synergy can be found between the specific way of generating initial depth values and the process for improving these. The combination has in practice been found to provide an accurate resulting depth map for many typical images.

In accordance with an optional feature of the invention, the depth map source is arranged to selectively apply a spatial filter to non-confident pixels of the depth map.

The selective spatial filtering may provide a particularly suitable depth map for the subsequent processing by applying one or more of the depth modification operations.

According to an aspect of the invention there is provided a method of processing a depth map, the method comprising: providing a depth map for an image, the depth map comprising depth values for pixels of the depth map; providing a confidence map comprising confidence values for pixels of the depth map, the confidence value for a pixel designating the pixel as a confident pixel or a non-confident pixel, a confident pixel having a depth value meeting a confidence criterion and a non-confident pixel having a depth value not meeting the confidence criterion; performing a depth modification operation comprising modifying depth values for pixels of the depth map, the depth modification comprising setting a modified depth value for a first pixel to a current depth value for the first pixel if the first pixel is designated as a confident pixel or if there are no confident pixels within a neighborhood set of pixels for the first pixel, and otherwise setting the modified value to a highest depth value of the current depth value and a depth value determined as a function of depth values of pixels within the neighborhood set of pixels that are designated as confident pixels.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a depth map for a three dimensional image being a frame of a three dimensional video sequence. However, it will be appreciated that the invention is not limited to this application but may be applied to e.g. individual three dimensional images consisting in an image and an associated depth map. Similarly, the description will focus on an application in a system generating view images for an autostereoscopic display but it will be appreciated that this is merely a specific example, and that the depth processing will be equally applicable to many other applications and uses.

Figure 1:
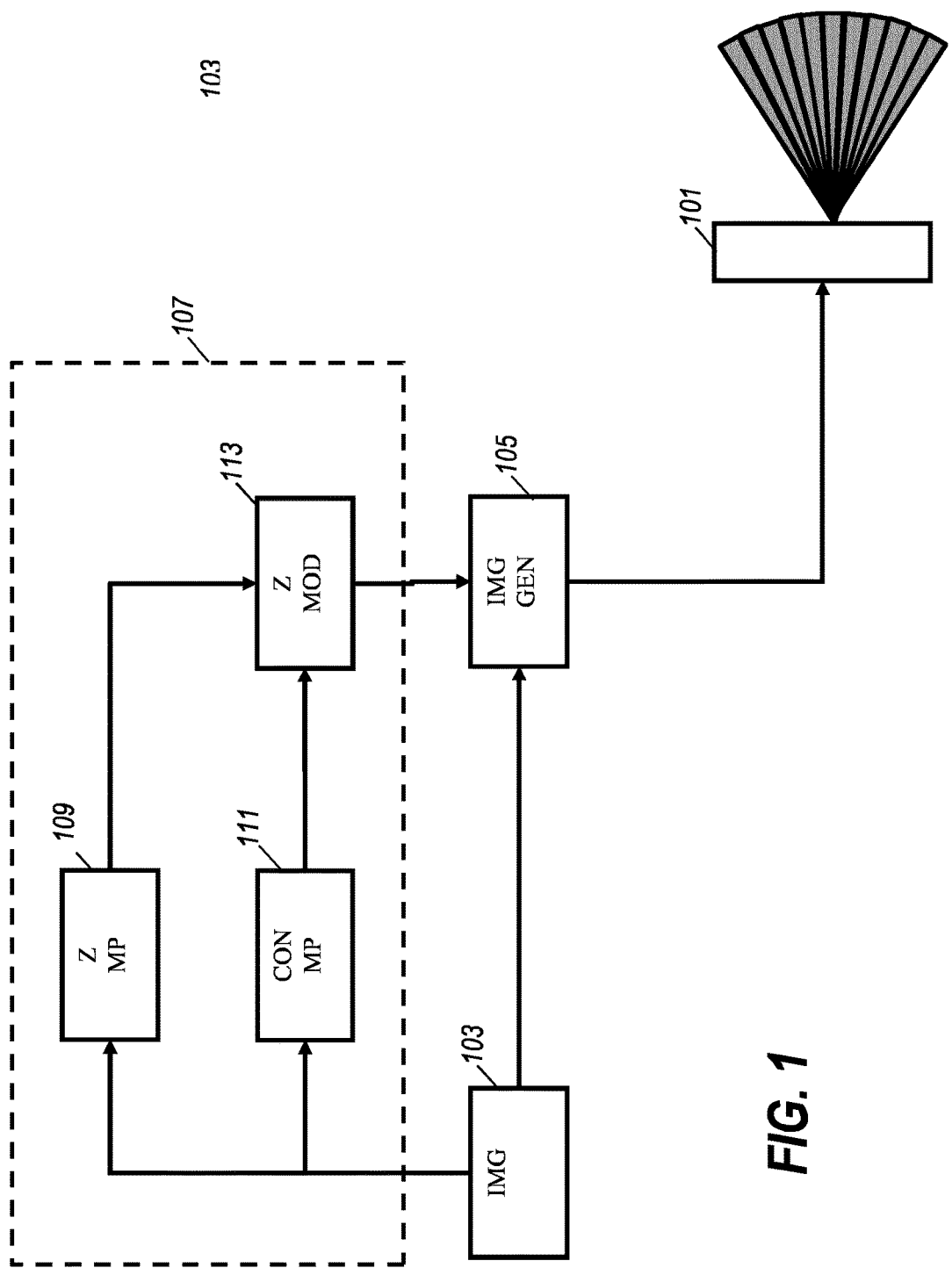
FIG. 1 is an illustration of an example of a display system comprising an apparatus in accordance with some embodiments of the invention.

FIG. 1 illustrates an example of a system in accordance with some embodiments of the invention. In the specific example, images corresponding to different views of an autostereoscopic display 101 are generated from an input three dimensional image. The input three dimensional image may for example be represented by a single image with an associated depth map, or may e.g. be represented by stereo images from which an associated depth map can be extracted.

Figure 2:
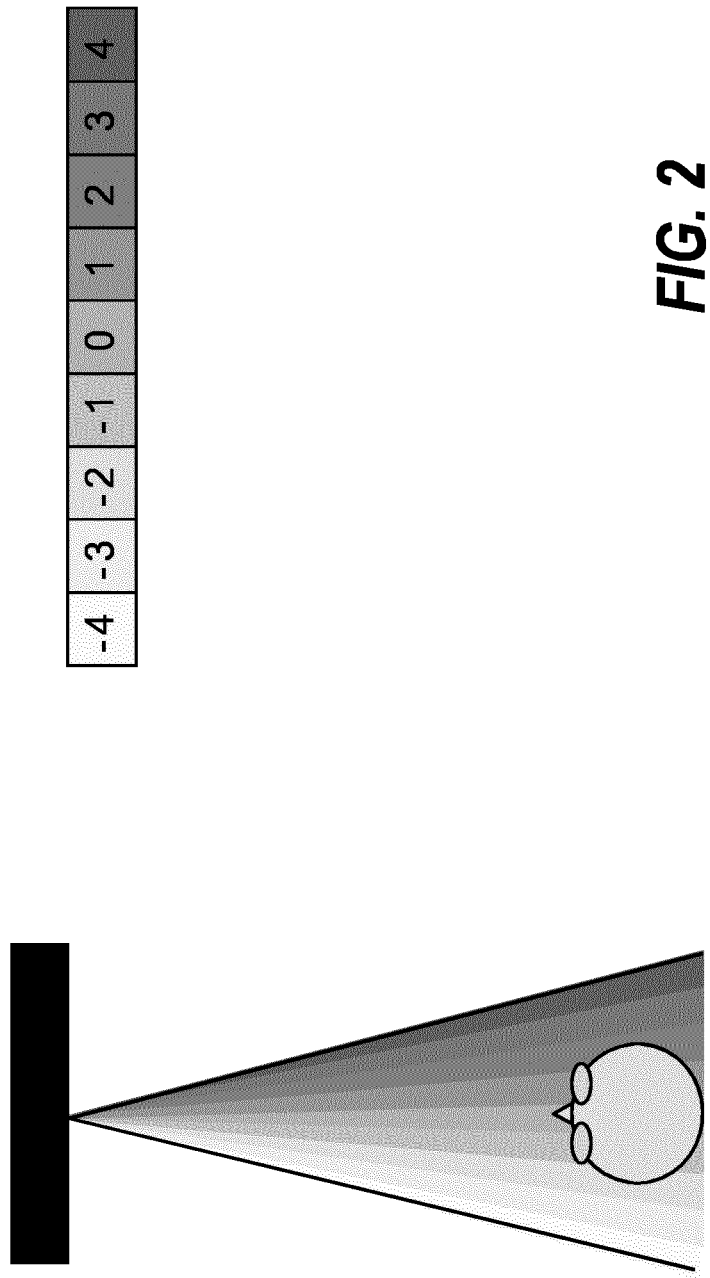
FIG. 2 illustrates an example of view images being projected from an autostereoscopic display.

Typically, autostereoscopic displays produce "cones" of views where each cone contains multiple views that correspond to different viewing angles of a scene. The viewing angle difference between adjacent (or in some cases further displaced) views is generated to correspond to the viewing angle difference between a user's right and left eye. Accordingly, a viewer whose left and right eye see two appropriate views will perceive a three dimensional effect. An example of an autostereoscopic display generating nine different views in each viewing cone is illustrated in FIG. 2.

Autostereoscopic displays tend to use means, such as lenticular lenses or parallax barriers/barrier masks, to separate views and to send them in different directions such that they individually reach the user's eyes. For stereo displays, two views are required but most autostereoscopic displays typically utilize more views. Indeed, in some displays a gradual transition of view directions is performed over an image such that different parts of an image may be projected in different viewing directions. Thus, in some more recent autostereoscopic displays a more gradual and continuous distribution of image regions over view directions may be applied rather than the autostereoscopic display rendering a fixed number of complete views. Such an autostereoscopic display is often referred to as providing fractional views rather than full views. More information on fractional views may e.g. be found in WO 2006/117707.

However, common to most autostereoscopic displays is that they require image information to be generated for a relatively large number of different view directions. However, typically three dimensional image data is provided as stereo image or as an image with a depth map. In order to generate the required view directions, image view shifting algorithms are typically applied to generate suitable pixel values for rendering. Such view shifting is based on depth information and specifically pixels tend to be horizontally shifted between different views with the magnitude of the shift depending on the depth of the pixel. The shift increases with the distance to the display or screen depth (for which there is no shift) and is in opposite directions for objects in front of and behind the screen depth.

The display system of FIG. 1 comprises an image unit 103 which is arranged to provide a three dimensional image of a scene to be rendered by the autostereoscopic display 101. The image unit 103 is fed to an image generator 105 which is arranged to generate view images for the autostereoscopic display 101. The image generator 105 generates the view images by view shifting based on at least one two dimensional image received from the image and on a depth map providing depth information for the image.

The image unit 103 may in some embodiments be arranged to simply receive a three dimensional image as an input two dimensional image with an associated depth map from any suitable internal or external source. For example, a video signal comprising three dimensional images represented by an image and an associated depth map may be received from a network (such as the Internet), a broadcast signal, a media carrier etc. Such an image and depth map representation may for example be generated by an infrared based ranging depth camera.

In other embodiments, the image unit 103 may e.g. receive a three dimensional image as a plurality of images corresponding to different view angles, and specifically as a stereo image with an image corresponding to the left and right eye respectively of a viewer. Such an image may for example be generated by a stereo camera. In such embodiments, the system may be arranged to generate a depth map based on disparity estimation performed on the images. In some embodiments, the received three dimensional image may be represented by a two dimensional image with an associated depth map generated by an external source by disparity estimation from e.g. stereo images.

The image generator 105 is arranged to generate the view images for the autostereoscopic display 101 by view point shifting based on a depth map for the two dimensional image (for brevity the following description will focus on the image generator 105 generating the view images by shifting from a (central) two dimensional image and a depth map. However, it will be appreciated that in other embodiments, the view image generation may be based on more than one two dimensional image as known to the skilled person).

In the system of FIG. 1, the depth information received by the image unit 103 is modified before being fed to the image generator 105. Thus, the image unit 103 is fed to an apparatus in the form of a depth unit 107 which is coupled to the image unit 103 and which is arranged to process a depth map to generate a modified depth map. The modified depth map is then fed to the image generator 105 where it is used to generate the view images for the autostereoscopic display 101.

Thus, the image generator 105 receives the modified depth map from the depth unit 107 and the input image from the image unit 103. The image generator 105 is arranged to generate the view images for the autostereoscopic display 101 by performing view shifting to generate view images for the specific view directions associated with the different views produced by the autostereoscopic display 101. The image generator 105 is arranged to generate these images by a view shifting algorithm based on the input image and the modified depth map.

It will be appreciated that the skilled person will be aware of many different view shifting algorithms and that any suitable algorithm may be used without detracting from the invention.

The perceived image quality and depth perception is heavily dependent on the quality and accuracy of the generated view images. The generation of these view images by image shifting is further heavily dependent on the quality and accuracy of the depth information on which the shift operation is performed. Indeed, many three dimensional image operations are heavily dependent on the quality of the depth information. For example, stereoscopic views may be generated based on depth information such that the presented image can follow e.g. the users head movement (e.g. allowing a viewer of a glasses based three dimensional image to see around foreground images by moving his head).

However, in most practical applications, the provided depth information is imperfect. In particular, depth maps generated by disparity estimation from images captured at different viewing angles tend to generate areas in which depth information cannot be provided or is highly uncertain. Such areas may for example occur for objects (parts) that are not visible in both (all) images or for areas which are similar to other areas or have little or no texture or repetitive patterns. Similarly, for a depth map generated by depth cameras, areas may typically occur for which the depth information is missing or unreliable. Such areas may for example correspond to objects that are far away or have unsuitable infrared reflection characteristics (e.g. hair).

In the image rendering system of FIG. 1, the depth unit 107 is arranged to improve the depth map and specifically it is arranged to provide improved depth information for areas in which the original depth map values are considered to be unreliable. The approach may specifically assign or determine depth values in areas that are considered to be unreliable based on depth values of surrounding areas. Further, the approach is based on this being subject to a depth order constraint which may specifically control the depth modification such that the new depth values in the unreliable areas are restricted to be further back than the depth values that are considered reliable within a given neighborhood. The depth unit 107 uses a specific approach described in more detail by exemplary embodiments in the following.

The depth unit 107 comprises a depth map source 109 which provides a depth map for the input image. In some embodiments, the depth map source 109 may simply receive a depth map from the image unit 103. For example, in some embodiments, the image unit 103 may receive a three dimensional video stream which for each frame comprises a two dimensional image and an associated depth map. The depth map may be extracted by the depth map source 109. In other embodiments, the depth map source 109 may itself be arranged to generate the depth map. For example, the depth map source 109 may receive stereo images from the image unit 103 and proceed to generate the depth map by disparity estimation based on the stereo images.

The depth values comprised in the depth maps may be any suitable representation of depth, such as specifically a depth coordinate (z) value or a disparity value representing shifts between images of different view directions. The higher the depth value the higher the depth, i.e. the further away from the viewer. Thus, an increasing depth value is indicative of an increasing distance from a (nominal) view position in front of a three dimensional display.

In addition, the depth unit 107 comprises a confidence map source 111 for providing a confidence map comprising confidence values for pixels of the depth map. The confidence value for a pixel is indicative of the reliability of the depth value pixel and indicates whether the pixel is considered to have a reliable depth value or to not have a reliable depth value. Thus, the confidence value reflects the confidence in the depth value for the pixel. Indeed, as depth value generation for images of real scenes inherently include an element of estimation, the generated depth values are inherently depth value estimates and may include some uncertainty. The degree of uncertainty varies for different pixels depending on the specific properties for that pixel (e.g. depending on visual properties for a disparity based estimation, infrared reflection characteristics for ranging depth camera etc). The confidence value for a given pixel reflects the uncertainty of the depth value for that pixel.

The confidence map provided by the confidence map source 111 comprises binary values and basically designates the pixels as confident (reliable) pixels or as non-confident (non-reliable) pixels. Thus, some pixels are considered confident/reliable and have depth values that should not be changed. However, other pixels are considered non-confident/unreliable and have depth values that may be too uncertain and which it may be desirable to modify.

It should be appreciated that in some embodiments, the confidence map may be populated by non-binary values. For example, a soft-decision confidence estimate value may be stored for each pixel. However, such a non-binary confidence value will still reflect whether the pixel is considered a confident pixel or a non-confident pixel. Indeed, the process may consider all pixels for which a non-binary confidence value is above a threshold as a confident pixel, and pixels for which the value is below (or equal to) the threshold as non-confident pixels. Indeed, in some embodiments, the designation of pixels as confident or non-confident pixels may even be a relative determination, i.e. it may depend on the confidences of other pixels. For example, a pixel may be considered confident if it has a higher confidence value than the neighbor it is being compared with.

Thus, it will be appreciated that in some embodiments, the confidence map may comprise confidence values which may indicate a confidence value and whether this confidence value corresponds to a confident or non-confident pixel may first be determined during the processing (and possibly in comparison to other pixel confidences). Thus in some embodiments the reliability criterion determining whether a pixel is confident or non-confident may be applied (possibly multiple times) during the subsequent processing rather than prior to the storing of values in the confidence map.

However, for clarity and brevity, the following description will focus on embodiments wherein the depth map comprises binary values which directly reflect whether the individual pixel is designated as a confident or a non-confident pixel. Thus, in these embodiments, a confidence/reliability criterion may be applied to non-binary confidence values and the results may be stored as binary values in the confidence map.

Thus, in the specific example, the depth map comprises binary confidence values for the depth map and designates the depth map pixels as either confident/reliable pixels or as non-confident/unreliable pixels.

It will be appreciated that different approaches can be used for designating pixels as confident/reliable or non-confident/unreliable. Specifically, a confident pixel is one having a depth value meeting a confidence/reliability criterion and a non-confident pixel is a pixel having a depth value not meeting the confidence/reliability criterion. In the present case, the criterion is applied prior to the population of the confidence map. In other embodiments, non-binary confidence values may be stored in the depth map and the determination of whether these confidence values designate confident or non-confident pixels may not be determined until application of the reliability criterion during processing.

It will be appreciated that the confidence criterion may be different in different embodiments and will be selected on the basis of the specific requirements and preferences of the individual embodiment.

For example, pixels may be designated as reliable pixels except for pixels belonging to areas in which there is little or no texture, a repetitive pattern, or where no matching image area can be identified in the other image.

In many embodiments, confidence values may be generated as a by-product of the depth estimation. As mentioned, areas with little texture may be non-confident, but also areas with noisy or extreme depth values may be considered non-confident. Thus, in many embodiments, the depth map generation process (which may be part of the processing by the depth map source 109) may provide information for a confidence calculation performed by the confidence map source 111.

As a specific example, disparity estimation may be based on selecting an area in the right eye image and finding a corresponding area in the left eye image. The corresponding disparities may be used to generate a first depth map. The process may then be repeated but starting by selecting an area in the left eye image and finding a corresponding area in the right eye image. If the two approaches result in disparity estimates that are sufficiently close, the pixel is designated as being a confident/reliable pixel. Otherwise, it is designated as being a non-confident/reliable pixel.

For a depth ranging camera, the designation of pixels as confident/non-confident may e.g. be achieved by applying a threshold to the brightness of the received light signal. When the light or pattern transmitted by the (infrared) light source is reflected on objects that are too distant or scattering the incident light away from the sensor, very little (or no) light is returned to the sensor, and distances cannot be reliably estimated.

It will be appreciated that different approaches and criteria may be used in different embodiments and that it is not essential which approach is used. Indeed, the approach is based on a confidence map being available but not on how this is generated (or even how accurate it is).

In some embodiments, the confidence map source 111 may be arranged to itself perform the process of determining the confidence values. In other embodiments, the algorithms may be performed externally and the data may be provided with the input signal. For example, a ranging depth camera may directly generate an output which includes an image, an associated depth map, and an associated reliability map indicating the confidence in the generated depth values. Such a data stream may directly be provided to the image unit 103. The confidence map source 111 may in some embodiments simply extract such an available map. In some embodiments, the confidence map source 111 may generate the binary confidence map by hard quantizing a provided reliability map having non-binary reliability estimates.

The confidence map source 111 and the depth map source 109 are coupled to a depth modifier 113 which is arranged to process the depth map based on the confidence map to generate a modified depth map which is then fed to the image generator 105 and used for the image shift operations.

The depth modifier 113 performs a depth modification operation which may modify depth values for pixels of the depth map. Typically, the depth values for confident pixels are not modified whereas depth values for non-confident pixels may be modified or may not be modified dependent on the presence and values of confident pixels in the neighborhood.

The depth modification operation thus includes sequentially processing each pixel of the depth map/confidence map thereby modifying the depth map. For convenience, the state of the depth map on which the operation is performed (i.e. the depth map prior to the depth modification operation) will be referred to as the input depth map and the state of the depth map resulting from the depth modification operation (i.e. the depth map after the depth modification operation) will be referred to as the output depth map.

If the current pixel is a confident pixel, the depth modifier 113 does not change the depth value but rather maintains the current depth value. Thus, in this case, the depth value of the output depth map is the same as the depth value of the input depth map.

However, for non-confident pixels, the processing depends on other pixels within a neighborhood. The neighborhood is typically relatively small and the description will focus on a specific example where the neighborhood is a 3×3 pixel block, i.e. it includes all pixels adjacent to the current pixel. However, in other embodiments, other sizes will be used and indeed the described principles may be applied to any size or shape of neighborhood region with the specific selection depending on the preferences and requirements of the individual embodiment. Typically, the size and shape of the neighborhood will be a tradeoff between parameters including e.g. the processing efficiency and low pass filtering effect.

Thus, for non-confident pixels, the depth modifier 113 considers a neighborhood set of pixels which in the specific example includes all pixels adjacent to the current pixel.

If the depth modifier 113 determines that there are no other confident pixels within the neighborhood set, it proceeds to maintain the current depth value, i.e. if there are no confident pixels in the neighborhood set, then the depth value in the output depth map is set to be the same as the depth value in the input depth map.

However, if there are any confident pixels within the neighborhood set, then the depth modifier 113 proceeds to generate a depth value as a function of the depth values of pixels within the neighborhood set but including only pixels that are designated as confident pixels. This depth value is in the following referred to as an estimated depth value. The estimated depth value may be generated as a function of the depth values of all confident pixels in the neighborhood set while disregarding the non-confident pixels, i.e. the estimated depth value does not depend on depth values of the non-confident values.

The function for generating the estimated depth value may be different in different embodiments, or may even vary dynamically within a specific implementation. As a specific example, the estimated depth value may be generated as an average value of the depth values of the confident pixels. Providing the neighborhood set is selected sufficiently small, the estimated depth value may thus be a good estimate of the correct depth value for the non-confident pixel.

However, the depth modifier 113 does not merely proceed to assign the estimated depth value to the non-confident pixel but rather it compares the estimated depth value to the current or original depth value (i.e. the depth value of the input depth map). It then selects the highest depth value (i.e. the one furthest from the viewer) and uses this as the modified depth value, i.e. the depth value of the output depth map is set to the highest depth of the depth value of the input image and the estimated depth value.

Thus, in the approach, the depth modifier 113 determines depth values for non-confident pixels based on depth values of confident pixels within a suitable neighborhood. However, in addition it employs a depth order constraint which ensures that a new depth value will only be assigned to the pixel if the new depth value is further back than the current depth value.

Such a depth order constraint has been realized by the Inventors to prevent artefacts that may sometimes occur in conventional approaches for determining depth values based on other depth values. Specifically, it may reduce the risk, or in some cases prevent that objects corresponding to uncertain areas will incorrectly be presented as being in front of foreground objects. Thus, an improved three dimensional rendering can be achieved.

The described approach is directed towards a system wherein a depth map is modified based on a confidence map. In the approach, pixels are classified as confident or non-confident pixels. For a given pixel, the modified depth value may be set as follows:

If
    the pixel is designated as a confident pixel
or
    there are no confident pixels in the neighborhood
or
    a modified depth value is in front of the original depth value
then
    the original depth value is maintained (i.e. the modified/output depth value is set to the original depth value, i.e. no change in the depth value occurs)

Otherwise
> the modified depth value is set to a replacement (neighborhood determined) depth value where
> the replacement (neighborhood determined) depth value is a function of depth values for confident pixels in the neighbourhood.

The approach uses a specific decision tree for determining when it is appropriate to change the depth value to be one that is determined from the depth values in a neighborhood of the current pixel and when the original depth value should be maintained unchanged. The decision tree is based on a classification of pixels into confident and non-confident pixels. Further, if the decision tree results in a decision to change the depth value then only confident pixels are considered, i.e. the determination of the replacement depth value is also dependent on the classifications.

The approach defines a criterion for when to maintain the original depth value and when to change this based on a binary designation and specifically considers both whether the pixel itself is confident as well as whether there are confident pixels in the neighborhood. The depth is only changed in one out of the four possible options.

The designation/classification is further used to (potentially) discard some pixels in the neighborhood when determining the replacement depth value. It is also noted that the specific constraint on the depth order is closely integrated with the other tests/evaluations of the decision tree. Indeed, it is noted that the test of whether the replacement depth value is in front of the original depth value or not is only relevant to the specific situation where the first pixel is not a confident pixel but there are one or more confident pixels in the neighborhood. Thus, it specifically relates to the scenario where the original depth value is considered unreliable whereas the replacement depth value is considered reliable as it is only based on reliable pixels. However, the test defines that even in this case the original value should be chosen if it is behind the replacement depth value. Thus, it defines a specific scenario in which the unreliable value is chosen over the reliable value. This is counterintuitive but the Inventors have realized that it surprising results in a depth map which e.g. when rendered is perceived to be of higher quality than if the more reliable value is always used.

Thus, whereas the other tests in the decision tree can be considered to try to identify the most reliable depth values such that the output modified depth value can be determined on the basis of these, the depth constraint requirements take the opposite approach and select the least reliable option, namely the output depth value is set to the unreliable value even though a more reliable replacement value is available.

The depth modifier 113 may further modify the confidence map during the depth modification operation. Specifically, for a confident pixel, the confidence value is maintained as being confident. Thus, once a pixel is designated as being confident, it will remain so.

Secondly, if a pixel is non-confident but the number of confident pixels within the neighborhood is larger than zero (i.e. if there is at least one confident pixel in the neighborhood set), then the pixel is changed to be designated as a confident pixel. Thus, once an estimated depth value is calculated for a non-confident pixel, the pixel will be assigned the original depth value or the estimated depth value (the one representing the highest depth) and the pixel will now be designated as a confident pixel (and thus not subsequently be modified).

However, for a non-confident pixel for which there are no confident pixels in the neighborhood, the pixel is still considered to be a non-confident pixel.

The modified depth map values and the modified confidence map values are not used when processing other pixels as part of the depth modification operation, i.e. the depth modification operation is performed on the basis of the input depth map and the input confidence map.

When processing the pixels of the depth map sequentially, the depth modifier 113 thus proceeds to grow or expand the areas of confident pixels into areas of non-confident pixels. The degree of this growth or expansion is determined by the size of the neighborhood considered. The larger the neighborhood, the more a confident area can intrude into a non-confident area (in essence the effect or impact that a confident pixel can have is limited by the size of the neighborhood). The effect of performing the depth modification operation is thus that the regions of non-confident pixels are decreased by the confident pixel regions expanding into the non-confident regions by an amount given by the neighborhood size. As a result of the depth modification operation, a number of non-confident pixels in the border areas have been assigned new values that are subject to a depth order constraint and have been changed to be considered confident pixels.

In some embodiments, the depth modifier 113 may be arranged to iterate the depth modification operation where each depth modification operation is performed on a modified depth map generated in the previous iteration (except for the first iteration which is based on the original depth map and confidence map received from the depth map source 109 and confidence map source 111 respectively).

Thus, in this approach, the depth modifier 113 applies a depth modification operation to generate an output depth map and an output confidence map from an input depth map and an input confidence map as previously described. It then proceeds to perform the depth modification operation again using the previously generated output depth and confidence maps as input depth and confidence maps.

In this way, the confident regions may iteratively grow into non-confident regions with the expansion in one operation utilizing the values generated by the previous expansion. Thus, the confident regions may iteratively grow and the non-confident regions may correspondingly iteratively shrink.

Thus, in the specific example, the depth modifier 113 iterates the depth modification operation where each operation is based on the depth map and the confidence map. The following depth modification operation is then based on the modified depth map and confidence map of the previous iteration. Specifically, the depth modifier 113 is arranged to change a pixel from being non-confident to being a confident pixel in response to a detection that the neighborhood set comprises at least one confident pixel. If so, an estimated depth value can be determined and potentially be assigned to the pixel (if it is further back than the original value). The new value is thus considered reliable and is therefore indicated to be useful as a confident pixel in subsequent operations.

In the following, a specific example of the operation in accordance with the previous description is provided. The example is based on a depth map in the form of a disparity map $D(x,y)$ and a confidence map $C(x,y)$ provided by the depth map source 109 and the confidence map source 111 respectively.

In the example, a depth order constraint is implemented as a recursive filter operation that is run for a number of iterations. Each iteration starts from the disparity map and confidence map from the previous iterations and results in an updated disparity map and an updated confidence map. Let $D^{(k)}(x,y)$ denote the disparity map at current iteration k.

Each iteration then updates the disparity map as:

$$D^{(k+1)}(x, y) \leftarrow \begin{cases} D^{(k)}(x, y) & \text{if } C^{(k)}(x, y) = \text{true} \\ D^{(k)}(x, y) & \text{if } C^{(k)}(x, y) = \text{false} \wedge |N_{confident}| = 0 \\ \max(D_{mean}, D^{(k)}(x, y)) & \text{otherwise} \end{cases}$$

and the confidence map (with $C^{(k)}(x,y)$ denoting the confidence map at iteration k) as:

$$C^{(k+1)}(x, y) \leftarrow \begin{cases} \text{true} & \text{if } C^{(k)}(x, y) = \text{true} \\ \text{true} & \text{if } C^{(k)}(x, y) = \text{false} \wedge |N_{confident}| > 0 \\ \text{false} & \text{otherwise} \end{cases}$$

where $$D_{mean} = \frac{\sum_{(x',y') \in \{(x_{confident}, y_{confident})\}} D^{(k)}(x', y')}{N_{confident}}.$$

The set of confident pixels in the neighborhood is denoted by $\{(x_{confident}, y_{confident})\}$ and $N_{confident}$ denotes the number of confident pixels in the neighborhood.

The number of iterations may be dependent on the specific preferences and requirements of the individual embodiment. However, in many embodiments, the depth modifier 113 may be arranged to perform a predetermined number of iterations. Thus, the depth modifier 113 may be arranged to iterate the depth modifier 113 a fixed number of times with each iteration potentially expanding the confident regions further into non-confident regions.

The use of a predetermined number of operations has been found to provide a highly advantageous operation in many embodiments. In particular, it has been found to result in a low complexity and robust operation which still results in a high quality three dimensional perception for most images and displays. In particular, it has been found that a relatively low number of operations is sufficient. This can be understood from the fact that the input disparity values are bounded and fall within a known range. When using a neighborhood that extends only a single pixel, it is only necessary to grow maximally a number of iterations that is equal to the maximum possible disparity difference. Since this can still be large, an advantageous approach in many scenarios is to grow a distance that corresponds with a disparity step being is observed between objects in practice. For full HD video a representative depth step could be 32 pixels. Choosing such a distance will compensate for most artefacts.

In some embodiments, the depth modifier 113 may be arranged to dynamically adapt a number of iterations in response to a depth property determined from depth values of the depth map. For example, the number of iterations may be increased for increasing depth values. E.g. in some embodiments, the depth modifier 113 may be arranged to determine an average or maximum depth value and the number of iterations may be determined as a function of this value. The higher the average or maximum depth, the higher the number of iterations.

As another example, the depth value variance may be determined and the number of iterations may be determined based on the variance. Thus, specifically, the number of iterations may be increased for increasing depth variance.

In some embodiments, the number of iterations may be different for different areas of the image. For example, the image may be divided into regions and the number of iterations within each region may be dependent on the depth values within that region (e.g. the number of iterations may be determined as a function of the average or maximum depth value within the region).

Such adaptive approaches may provide improved performance in many scenarios and embodiments.

As previously mentioned, the size of the neighborhood considered for the individual pixels may be different in different embodiments depending on the specific preferences or requirements. However, in many embodiments, the neighborhood may be relatively small thereby restricting the amount of growth of the confident regions to a relatively small amount in each iteration.

Indeed, in many embodiments, the neighborhood set includes only pixels having a distance to the first pixel less than a given threshold where the threshold is five pixels or smaller. Indeed, in many embodiments, the neighborhood set may comprise no more than 25, 16, or 9 pixels. The pixels of the neighborhood set may specifically be symmetrically arranged around the current pixel.

Thus, the neighborhood set may be considered to correspond to a kernel of a filter including a depth order constraint and considering only confident pixels as previously described. The kernel may have a diameter not exceeding 5, 4 or e.g. 3 pixel widths in many embodiments.

In some embodiments, the depth modifier 113 may be arranged to determine the size of the neighborhood set in response to depth values of the depth map. For example, the variance of the depth values in a region comprising an area of non-confident pixels may be determined and the size of the neighborhood set may be adapted in response to this value. For example, for larger variances, the neighborhood set size may be increased.

In the previous examples, the estimated depth value is determined by a function which comprises an averaging of depth values of confident pixels within the neighborhood set. However, it will be appreciated that in other embodiments, other functions may be used.

For example, in some embodiments, the function may comprise or consist in selecting a maximum of the depth values of the confident pixels within the neighborhood. Thus, in such an embodiment, the depth value of the current pixel will be set to the highest depth of the pixel itself and of the confident pixels in the neighborhood. This may provide very efficient operation in many embodiments and may in particular provide a stronger depth order constraint.

In the previous description it has been assumed that the depth map is provided with some areas that comprise confident pixels and other areas that contain non-confident pixels. In the specific example, the image may be part of a three dimensional video sequence and specifically it may be one frame of a stereo image video sequence. In such an example, the initial depth values may be generated based on disparity estimation. However, disparity estimation is not feasible for areas/objects that are only visible in one of the images.

In (e.g.) such systems, the depth map source 109 may be arranged to generate initial depth values for non-confident pixels by performing prediction from other frames in the sequence, i.e. by performing temporal prediction.

As a simple example, an initial depth value may be set as the last depth value that could be determined based on disparity estimation (i.e. on the last determined depth value before occlusion). In other embodiments, more complex interpolation and estimation may be performed including e.g. motion estimation or interpolation using both previous and subsequent frames (i.e. specifically bidirectional prediction may be used).

Such an approach may provide a suitable initial depth map which may then be modified by the subsequent processing of the depth modifier 113.

In many embodiments, the depth map source 109 may be arranged to selectively apply a spatial filter to non-confident pixels of the depth map. The spatial filter may typically have a relatively small kernel which e.g. may be similar to the size of the neighborhood. Indeed, in many embodiments, the kernel for the spatial filter may be the same as the neighborhood set (i.e. the kernel for the selective spatial filter may be the same as the kernel for the depth order filter).

The spatial filter is selectively applied to the non-confident pixel but not to the confident pixels. Thus, the depth values that are considered to be reliable are not modified but the depth values that are considered as unreliable are spatially filtered to reduce noise. Such a selective filter has been found to provide improved results in many embodiments and in particular has been found to provide a better perception for transitional areas without degrading the image quality in other areas.

The depth modification operation may then be applied to the selectively filtered depth map.

Following the (iterated) performance of the depth modification operation, the depth modifier 113 may in many embodiments perform a spatial filtering which may be applied to all pixels regardless of whether these are considered reliable or not, i.e. regardless of whether the pixels are confident or not confident.

This may reduce the overall noise in the depth map and may typically result in an improved perceived quality of the three dimensional experience.

In the previous description, the processing of the depth map pixels and confident map pixels have been described with an implicit assumption of each pixel directly corresponding to an image pixel, i.e. with an implicit assumption that the resolution of the depth map and the confidence map is the same as the resolution of the image.

However, it will be appreciated that this is not necessarily so, and that indeed in many embodiments the resolutions may be different. Indeed, typically the resolution of the depth map and the confidence map will be lower than for the image. For example, the image may be divided into image pixel blocks of, say 3×3 or 8×8, pixels and a single depth value and confidence value may be generated for each block. The resolution of the depth and confidence maps may thus be substantially reduced with respect to the image resolution. However, it will be appreciated that the previously described processing of the depth map applies equally to such a reduced resolution depth map.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus for processing a depth map, the apparatus comprising:
   a depth map source circuit, the depth map source circuit arranged to provide a depth map for an image, wherein the depth map comprises pixels and depth values associated with at least one of the pixels;
   a confidence map source circuit, the confidence map source circuit arranged to provide a confidence map, wherein the confidence map comprises confidence values associated with at least one of the pixels,
   wherein the confidence value for a pixel designates at least one pixel as a confident pixel or a non-confident pixel,
   wherein a confident pixel has a depth value meeting a reliability criterion and a non-confident pixel has a depth value not meeting the reliability criterion; and a depth modifier circuit arranged to perform a depth modification operation, the depth modification operation comprising modifying depth values for at least one of the pixels, wherein the depth modifier circuit is arranged to set a modified depth value for a first pixel to a current depth value for the first pixel if the first pixel is designated as a confident pixel, wherein the depth modifier circuit is arranged to set a modified depth value for a first pixel to a current depth value for the first pixel if there are no confident pixels within a neighborhood set of pixels for the first pixel, wherein the depth modifier circuit is arranged to set the modified value to a highest depth value of the current depth value and a determined depth value, wherein the determined depth value is a function of depth values of pixels within the neighborhood set of pixels that are designated as confident pixels.

2. The apparatus of claim 1, wherein the depth modifier circuit is arranged to iterate the depth modification operation, wherein each depth moderation operation is performed on a modified depth map from a previous iteration.

3. The apparatus of claim 2, wherein the depth modifier circuit is arranged to, modify confidence values of the confidence map for each depth modification operation, wherein each depth moderation operation is based on a modified confidence map from a previous iteration.

4. The apparatus of claim 3 wherein the depth modifier circuit is arranged to change a pixel from being designated as a non-confident pixel to be designated as a confident pixel in response to a detection that the neighborhood set comprises at least one confident pixel.

5. The apparatus of claim 3 wherein the depth modifier circuit is arranged to perform a predetermined number of iterations.

6. The apparatus of claim 5 wherein the predetermined number of iterations is no more than eight iterations.

7. The apparatus of claim 2 wherein the depth modifier circuit is arranged to dynamically adapt a number of iterations in response to a depth property determined from depth values of the depth map.

8. The apparatus of claim 1 wherein the function of depth values comprises an averaging of depth values of pixels within the neighborhood set of pixels that are designated as confident pixels.

9. The apparatus of claim 1 wherein the function of depth values comprises selecting a maximum of depth values of pixels within the neighborhood set of pixels that are designated as confident pixels.

10. The apparatus of claim 1, wherein the neighborhood set includes only pixels with a distance to the first pixel of less than a threshold, wherein the threshold is less than or equal to five pixels.

11. The apparatus of claim 1 wherein the depth modifier circuit is arranged to determine a size of the neighborhood set in response to a depth property determined from depth values of the depth map.

12. The apparatus of claim 1 wherein the depth map is for a frame of a video signal and the depth map source circuit is arranged to determine initial depth values for non-confident pixels of the depth map using temporal prediction from other frames of the video signal.

13. The apparatus of claim 1 wherein the depth map source circuit is arranged to selectively apply a spatial filter to non-confident pixels of the depth map.

14. A method of processing a depth map, the method comprising:

providing a depth map for an image, the depth map comprising pixels and depth values associated with at least one of the pixels;

providing a confidence map comprising, wherein the confidence map comprises confidence values associated with at least one of the pixels of the depth map, wherein the confidence value for a pixel designates at least one pixel as a confident pixel or a non-confident pixel, wherein a confident pixel has a depth value meeting a confidence criterion and a non-confident pixel has a depth value not meeting the confidence criterion; and performing a depth modification operation comprising modifying depth values for pixels of the depth map, wherein the depth modification comprises setting a modified depth value for a first pixel to a current depth value for the first pixel if the first pixel is designated as a confident pixel, wherein the depth modification comprises setting a modified depth value for a first pixel to a current depth value if there are no confident pixels within a neighborhood set of pixels for the first pixel, wherein the depth modification comprises setting the modified value to a highest depth value of the current depth value and a depth value determined as a function of depth values of pixels within the neighborhood set of pixels that are designated as confident pixels.

15. A computer program product comprising computer program code arranged to perform all the steps of claim 14 when the program code is run on a computer.

16. The method of claim 14 further comprising iterating the depth modification, wherein each depth moderation operation is performed on a modified depth map from a previous iteration.

17. The method of claim 16 further comprising modifying the confidence values of the confidence map for each depth modification, wherein each depth modification operation is based on a modified confidence map from a previous iteration.

18. The method of claim 17 wherein the modifying is arranged to change a pixel from being designated as a non-confident pixel to be designated as a confident pixel in response to a detection that the neighborhood set comprises at least one confident pixel.

19. The method of claim 16 wherein the depth modification circuit is arranged to dynamically adapt a number of iterations in response to a depth property determined from depth values of the depth map.

20. The method of claim 14 wherein the function of depth values comprises an averaging of depth values of pixels within the neighborhood set of pixels that are designated as confident pixels.

* * * * *